March 25, 1952 F. J. BRUGMANN 2,590,150
TOOL FOR REMOVING HUB CAPS
Filed Oct. 25, 1948
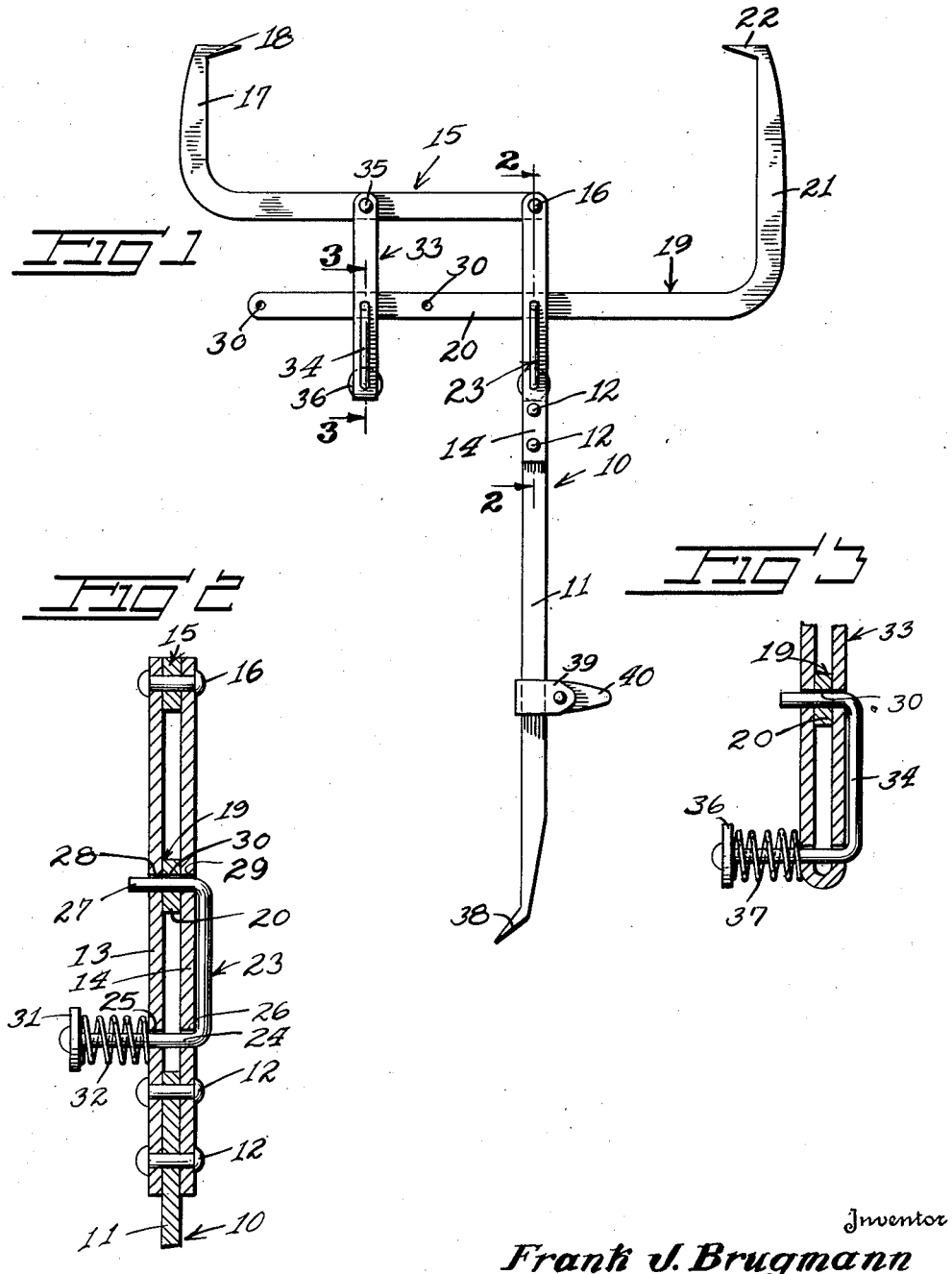
Inventor
Frank J. Brugmann
By Wilfred E. Lawson
ATTORNEY Patented Mar. 25, 1952

2,590,150

UNITED STATES PATENT OFFICE 2,590,150

TOOL FOR REMOVING HUB CAPS

Frank J. Brugmann, Greeley, Colo.

Application October 25, 1948, Serial No. 56,431

1 Claim. (Cl. 29—245)

This invention relates to a tool, and more particularly to a tool for removing a hub cap from a vehicle wheel.

The object of the invention is to provide a tool which will enable the user to easily and quickly remove a hub cap from a vehicle wheel.

Another object of the invention is to provide a hub cap-removing tool which is extremely simple and inexpensive to manufacture.

Other objects and advantages will be apparent during the course of the following description.

In the accompanying drawings forming a part of this applicaion, and in which like numerals are employed to designate like parts throughout the same:

Figure 1 is a side elevational view of the hub cap-removing tool, according to the present invention;

Figure 2 is an elongated sectional view taken on the line 2—2 of Figure 1;

Figure 3 is an enlarged sectional view taken on the line 3—3 of Figure 1.

Referring in detail to the drawings, the tool is fabricated of a suitable metal and comprises an elongated handle 10. The handle 10 includes a shank 11 adapted to be gripped by the user for actuating the tool. Arranged in embracing relation with respect to one end of the shank 11 and secured to the latter by rivets 12 is a pair of spaced, parallel straps 13 and 14 which are arranged in alignment with the shank 11. Positioned between the outer ends of the straps 13 and 14 is a first L-shaped arm 15 which is pivotally connected to the straps by means of a pin 16. The arm 15 is shaped to define a transverse portion 17 which terminates in a tapered hook 18.

A second L-shaped arm 19 is bent to define a body portion 20, and a transverse portion 21 which terminates in a tapered hook 22 that is arranged in confronting relation with respect to the hook 18 on the arm 15. The body portion 20 of the arm 19 is slidably positioned between the straps 13 and 14 and the arm 19 is mounted for movement toward and away from the first arm 15 in order to use the tool on different sizes of hub caps.

For maintaining the second arm 19 immobile in its various adjusted positions, a bent hook or latch 23 is provided, Figures 1 and 2. The hook 23 includes a first section 24 which slidably projects through a pair of registering apertures 25 and 26 in the straps 13 and 14, respectively. The hook 23 further includes a second section 27 which slidably projects through a pair of registering apertures 28 and 29 in the straps 13 and 14, and the second section 27 also slidably projects through one of the spaced apertures 30 in the body portion 20 of the arm 19. Secured to the free end of the section 24 of the hook 23 is a washer 31 and interposed between the washer 31 and the strap 13 is a coil spring 32 for normally biasing the second section 27 of the hook 23 through the registering apertures in the straps 13 and 14 and through the corresponding aperture 30 in the arm 19. When the tool is to be adjusted to be used for different sizes of hub caps, the washer 31 is moved toward the strap 13 to effectively free the second section 27 of the hook from the registering apertures so that the arm 19 can be moved as desired. For maintaining the arms 15 and 19 of the tool in proper spaced relation, there is provided a U-shaped bracket 33, Figures 1 and 3, which slidably receives the body portion 20 of the arm 19. The bracket 33 is pivotally connected to the arm 15 by means of a pin 35. Coacting with the bracket 33 is a manually-operable latch or hook 34 which has the same construction as the previously-described hook 23. Thus, in adjusting the arms, the washer 36 is moved toward the bracket 33 to compress the coil spring 37 and free the hook from the aperture 30 in the arm 19 so that the arm 19 can be adjusted.

The other end of the shank 11 of the handle 10 is bent to define a tapered tip 38 which can be used for prying off certain types of hub caps from vehicle wheels. Slidably arranged on the shank 11 of the handle 10 is a sleeve 39 which pivotally carries a lug 40 forming a fulcrum when tip 38 is used.

In use, the hook 22 is interposed between the vehicle wheel and hub cap to be removed, and then the user moves the handle 10 to the left (Figure 1) so that the hook 18 will be moved toward the hook 22 and into engagement with the opposite portion of the hub cap. Since the hooks are tapered, the hub cap will be loosened and freed from the wheel upon continued movement of the tool handle.

As many embodiments may be made of this inventive concept, and as many modifications may be made in the embodiment hereinbefore shown and described, it is to be understood that all matter herein is to be interpreted merely as illustrative and not in a limiting sense.

I claim:

In a tool for removing hub caps, an elongated handle, a first arm having one end pivotally connected to an end of said handle and extending in angular relation with respect thereto, a second arm pivotally connected with said handle intermediate its ends inwardly from the said handle end and substantially parallel with respect to said first arm, angled portions at the outer ends of said arms, inturned hook portions at the outer ends of said angled portions adapted to be engaged behind the edge of a hub cap at opposite points thereon, and means pivotally connecting the inner end portions of said arms outwardly from the pivot connections of the same with said handle, said interconnecting means constituted in a pair of links abutted against the opposite sides of said inner end portions of said arms, the pivot connections between said second arm and said handle and said links being constituted in substantially U-shaped elements carried by said handle and said links, and coil springs mounted on one leg of said elements to releasably tension the other legs thereof in second arm pivoted positions.

FRANK J. BRUGMANN.

REFERENCES CITED

The following references are of record in the file of this patent:

UNITED STATES PATENTS

| Number | Name | Date |
|---|---|---|
| 1,163,018 | Knutson | Dec. 7, 1915 |
| 1,426,799 | Weil | Aug. 22, 1922 |
| 1,636,058 | Jordan | July 19, 1927 |
| 1,975,773 | Davis | Oct. 9, 1934 |
| 2,148,213 | Lyon | Feb. 21, 1939 |

FOREIGN PATENTS

| Number | Country | Date |
|---|---|---|
| 699,820 | France | Dec. 17, 1930 |